US009524572B2

(12) United States Patent
Narayanan et al.

(10) Patent No.: US 9,524,572 B2
(45) Date of Patent: Dec. 20, 2016

(54) PARALLEL PROCESSING OF PIXEL DATA

(75) Inventors: Raman Narayanan, Seattle, WA (US); Radoslav Petrov Nickolov, Bellevue, WA (US); Ming Liu, Redmond, WA (US); Rajendra Vishnumurthy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 965 days.

(21) Appl. No.: 12/952,327

(22) Filed: Nov. 23, 2010

(65) Prior Publication Data

US 2012/0127182 A1 May 24, 2012

(51) Int. Cl.
*G06T 1/00* (2006.01)
*G06T 11/40* (2006.01)

(52) U.S. Cl.
CPC .................... *G06T 11/40* (2013.01)

(58) Field of Classification Search
CPC ............. G06T 9/00; G06T 9/008; G06T 11/40
USPC .......... 345/506, 422, 522; 718/100; 370/351
See application file for complete search history.

(56) References Cited

U.S. PATENT DOCUMENTS

| 5,883,824 | A * | 3/1999 | Lee ........................ G06F 7/505 708/445 |
| 7,369,277 | B2 | 5/2008 | Ishihara |
| 7,643,702 | B1 * | 1/2010 | Brandt .......................... 382/289 |
| 7,742,661 | B2 | 6/2010 | Chan et al. |
| 2005/0041022 | A1 * | 2/2005 | Blot et al. ...................... 345/421 |
| 2005/0041031 | A1 * | 2/2005 | Diard ................... G06T 15/005 345/505 |
| 2005/0195198 | A1 * | 9/2005 | Anderson et al. ............ 345/506 |
| 2006/0095912 | A1 * | 5/2006 | Wood-Gaines et al. ...... 718/100 |
| 2006/0280161 | A1 * | 12/2006 | Liu et al. ....................... 370/351 |
| 2007/0216693 | A1 * | 9/2007 | Gruber .................... G06T 15/50 345/522 |
| 2008/0030512 | A1 * | 2/2008 | Jiao et al. ...................... 345/506 |
| 2008/0074433 | A1 * | 3/2008 | Jiao et al. ...................... 345/522 |
| 2009/0012920 | A1 * | 1/2009 | Kwok .................... G06N 3/004 706/12 |
| 2009/0074288 | A1 | 3/2009 | Nishida |
| 2009/0184960 | A1 * | 7/2009 | Carr et al. .................... 345/422 |
| 2009/0284535 | A1 | 11/2009 | Pelton et al. |
| 2009/0303553 | A1 | 12/2009 | Sugiyama |

OTHER PUBLICATIONS

"Digital Image Processing", Retrieved at << http://www.ciesin.org/docs/005-477/005-477.html >>, Retrieved Date: Aug. 19, 2010, pp. 1-19.

(Continued)

*Primary Examiner* — Phi Hoang
(74) *Attorney, Agent, or Firm* — Micah Goldsmith; Judy Yee; Micky Minhas

(57) ABSTRACT

One or more techniques and/or systems are disclosed for processing vector-based information for an image. From a set of pixels that comprises the image, a first subset of one or more pixels that are used in a raster representation of an element in the image, such as pixel values used to render the image, is identified. A first operation is performed in parallel for the respective one or more pixels in the first subset, such as by evaluating a batched first subset of pixels using stacked instruction for the first operation. The first operation comprises instructions for at least a first portion of a function for generating an image pixel value used to represent the element in the image.

20 Claims, 9 Drawing Sheets

(56) References Cited

OTHER PUBLICATIONS

Caarls, et al., "Skeletons and Asynchronous RPC for Embedded Data—and Task Parallel Image Processing", Retrieved at << http://sks.com.np/article/5/how-to-make-your-website-load-faster.html >>, Proceedings of the 9th IAPR Conference on Machine Vision Applications. MVA Conference Committee, May 16-18, 2005, pp. 4.
Watanabe, et al., "Parallel Extraction Architecture for Image Moments of Numerous Objects", Retrieved at << http://ieeexplore.ieee.org/stamp/stamp.jsp?arnumber=01508172 >>, Seventh International Workshop on Computer Architectures for Machine Perception (CAMP), Jul. 4-6, 2005, pp. 6.

* cited by examiner

PARALLEL PROCESSING OF PIXEL DATA

BACKGROUND

In a computing environment, an image there may be created in a variety of ways, such as using a digital camera, drawing a graphic using an application, or using an application to generate an image of existing data. Computer-based images, for example, can be represented a collection of pixels, such as by providing pixel values for color channels that represent the pixels (e.g., red, green, blue (RGB). Further, as another example, images may be represented as one or more functions, such as vector-based graphics. Using vector-based graphics, when converting to version that can be rendered on a user interface (UI), an input to the function can comprise a location in the image, and the output can comprise a pixel value for rendering the image. There are many kinds of such functions, which can be expressed in a variety of ways, including some procedural languages like Postscript.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Typically, when images that comprise functions (e.g., vector graphics) are converted to a rendered image (e.g., raster data), the one or more functions are iterated over each of the pixels for the image. That is, for example, if an image comprises ten thousand pixels (e.g., 100 by 100), the one or more functions for rendering the image are iterated ten thousand times.

Often, images comprise millions of pixels; therefore, creating an output image based on evaluating one or more functions of an image for respective pixels in the image can be tremendously time consuming, and computationally resource intensive. This can, among other things, lead to a reduced user experience when attempting load images in a UI.

Accordingly, one or more techniques and/or systems are disclosed for generating images from vector-based graphics data, for example, where the speed of a conversion process from the vector data to raster data can be improved. The processing of one or more functions, such as provided in a conversion operation, can be processed over the respective pixels in parallel. For example, the per-pixel processing can be broken down into basic mathematical operations, and processing instructions for the operations can be stacked over one or more batches of pixels. The mathematical operations can be performed on the batches of pixels, for example utilizing CPU and GPU parallel computation capabilities. Further, where per-pixel processing diverges, parallel processing paths can be created, and/or individual pixel processing can be performed.

In one embodiment for processing vector-based information for an image, a first subset of one or more pixels from a set of pixels comprising the image is identified, where the first subset comprises one or more pixels used in a raster representation of an element in the image. A first operation can be performed in parallel for the respective one or more pixels in the first subset. The first operation can comprise at least a first portion of a function for generating an image pixel value used to represent the element in the image.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
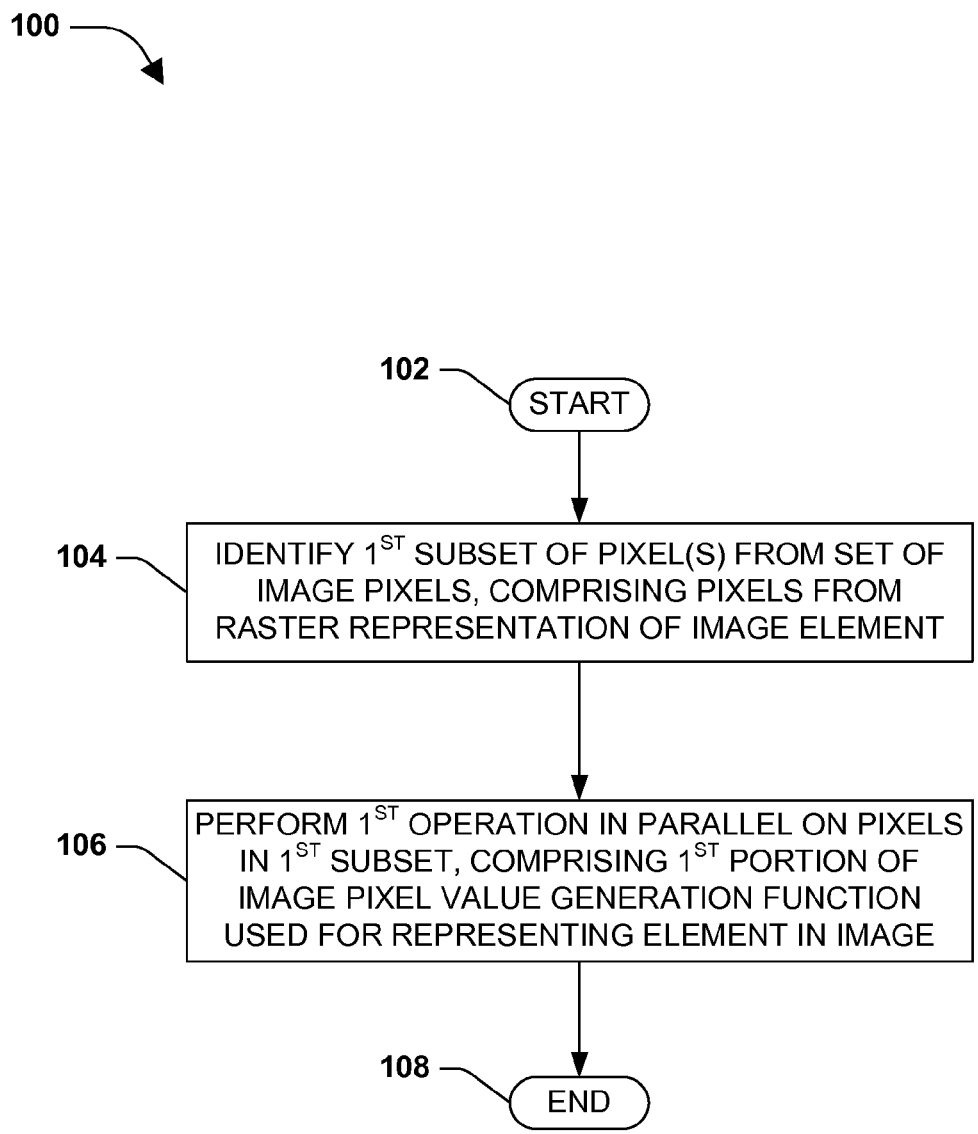
FIG. 1 is a flow diagram of an exemplary method for processing vector-based information for an image.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for generating images from vector-based graphics data, for example, where the speed of a conversion process from the vector data to raster data can be improved. When converting an image of vector-based data elements, the image can comprise functions that are used to determine pixel values for displaying an element in the rasterized image. The functions, for example, can be iterated over batches of pixels for the element, instead of over individual pixels, thereby improving image processing speed, among other things.

FIG. 1 is a flow diagram of an exemplary method 100 for processing vector-based information for an image. The exemplary method 100 begins at 102 and involves identifying a first subset of one or more pixels from a set of pixels that make up the image, at 104. Here, the first subset comprises one or more pixels that are used in a raster representation of an element in the image. For example, the viewed and/or created image comprises a plurality of pixels that make up the image. Further, in this example, the image can comprise a plurality of elements that are represented by the pixels in the image. Examples of elements may comprise text, pictures, graphics, animation, and more. In this embodiment, the first subset can comprise the pixels that represent one (or more) of the elements in the image when rasterized.

At 106 in the exemplary method 100, a first operation is performed in parallel for the respective one or more pixels in the first subset. The first operation comprises at least a first portion of a function used to generate an image pixel value representative of the element in the image. For example, the function that is used to determine the pixel value for a rasterized element can be iterated over the respective pixels in the first subset. However, in this embodiment, at least a portion of the function (e.g., or all of the function) can be performed over the respective pixels in parallel (e.g., concurrently).

Having performed the first operation in parallel over the respective pixels in the first subset, the exemplary method 100 ends at 108.

As an illustrative example, typically, an array of pixel data may be processed by executing a same function for every individual pixel, such as to yield color channel values (e.g., red, green, blue (RGB) color channels) for the pixels representing an element. Further, the function may comprise a sequence of mathematical operations (e.g., addition, multiplication, interpolation), combined with logical operations (e.g., capping with floor/ceiling values). Therefore, in this example, respective pixels may comprise an initial value (e.g., input value), and after evaluation by the function, can comprise a rasterization value (e.g., output value).

Parallelization of one or more portions of the function for generating an image pixel value used to represent the element in the image may be developed and custom-tuned towards specific, well-known algorithms (e.g., linear interpolation). However, this approach is time consuming, burdensome and may be limited in application. In one aspect, the parallelization can be generalized to an application of an arbitrary sequence of per-pixel operations. In one embodiment, the operations may be defined in terms of a programming language, where an execution environment can be produced that is targeted to application on a data array.

For example, a portion of the function may comprise an inversion of an RGB pixel byte value, such as: b ->255–b. In this example, instead of looping over a byte array and applying the operation for an individual byte, a sequence of byte batches can be looped over, thereby treating respective batches as an appropriately-sized "WORD" and invoking a parallel central processing unit (CPU) routine to invert the respective bytes in the WORD (e.g., concurrently).

Further, in this example, a next portion of the function may comprise adding a particular value to respective pixels. A parallel, uniform operation can be applied to respective values in the array, utilizing a similar batching approach. In one embodiment, if uniformity in a flow of the operations broken (e.g., if different evaluation results of a portion of the function lead to different sequences of instructions to be performed) one of two paths may be used. For example, pixels that follow a uniform operation path (e.g., without divergent results) can be grouped, such as into two or more paths (e.g., depending on results) and parallel execution of the two or more operation paths can continue. Additionally, if no uniform code paths are available for one or more pixels, pixels can be individually evaluated (e.g., fallback to a default of iterating the function over respective pixels).

Figure 2:
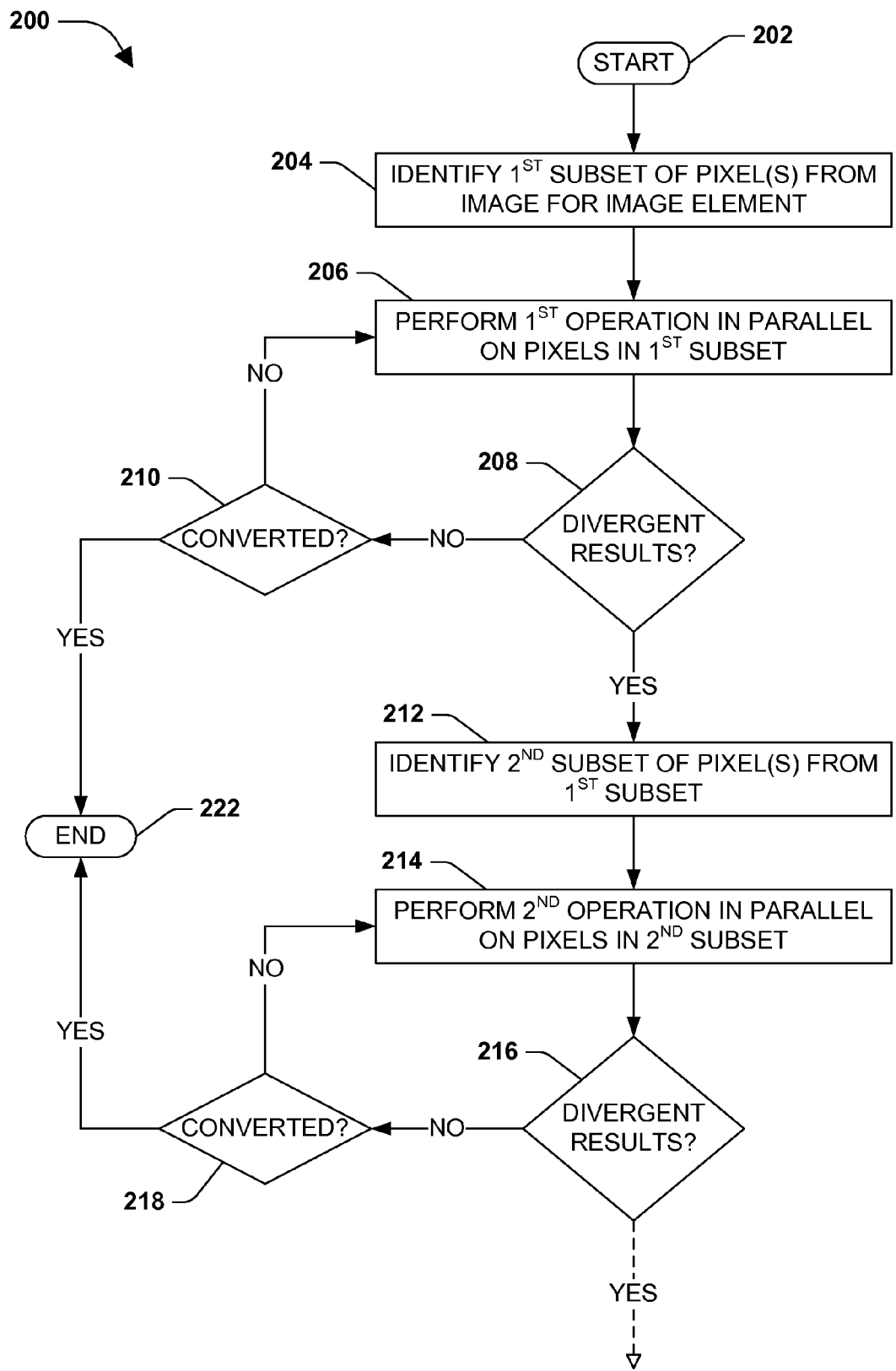
FIG. 2 is a flow diagram illustrating an example embodiment of one or more portions of a method for processing vector-based information for an image.

FIG. 2 is a flow diagram illustrating one example embodiment 200 of one or more portion of a method for processing vector-based information for an image, where one or more techniques described herein may be implemented. The example embodiment 200 begins at 202 and involves identifying a firs subset of one or more pixels from the image for an element in the image, at 204. In one embodiment, identifying the first subset can comprise identifying a number of pixels associated with a raster representation of the element in the image, and evaluating a resource cost of performing a first operation on the number of pixels associated with the raster representation of the element in the image.

For example, there may be some computing resource overhead added when pixels are grouped for the rasterization process, when compared with evaluating individual pixels. In this embodiment, for example, the number of pixels grouped (e.g., batched) together for evaluation may result in an addition of more than desired amount of computing resources when compared with a gain in image processing speed. In one embodiment, a desired threshold may be established (e.g., selected by a user, or programmatically) for a resource overhead to processing improvement evaluation. For example, a ratio threshold may be selected, where a ratio of resource increase to processing speed improvement is compared against the threshold.

In one embodiment, the one or more pixels can be grouped into the first subset if the resource cost (e.g., resource cost to speed improvement ratio) meets the desired threshold. For example, meeting the desired threshold may mean that there is a sufficient gain in image processing speed to justify the increase in computing resources used for the grouping (e.g., parallel processing). In another embodiment, the first operation may not be performed on respective pixels in parallel if the resource cost does not meet a desired threshold. That is, for example, the pixels may not be grouped in the subset if the resource cost does not justify the gain in image processing speed.

At 206 in the example embodiment 200, the first operation is performed in parallel on the respective pixels in the first subset. For example, a function for generating an image pixel value used to represent the element in the image can comprise a plurality of operations, portions of which may be performed sequentially, and/or concurrently. As an illustrative example, a first series of mathematical operations may be performed, as well as logic operations, such that the first mathematical operations can be performed sequentially, while a logic operation diverges an operational path for some pixels to second set of mathematical operations that can be performed concurrently with the first series of mathematical operations.

In this embodiment, for example, the first operation may comprise one or more potions of the function for generating the pixel value (e.g., including one or more mathematical operations, and/or logic operations), such that the pixel values generated by the portions of the function provide for parallel execution of the first operation. That is, for example, the first operation may comprise merely one mathematical operation or logic operation, or may comprise a plurality of mathematical and/or logic operations, which are executed over the first subset of pixels until a divergent result is provided by the operation for at least two of the pixels in the first subset.

In the example embodiment 200, at 208, if a divergent result is not obtained by the first operation (NO at 208), for example, by a portion of the first operation (e.g., an addition, subtraction, multiplication, inversion, logarithmic function, logic operation, etc.) for the pixels in the first subset, the first operation can continue until the pixels are converted, at 210, to the raster output values, or there is a divergent result. For example, a resulting operation value (e.g., resulting from some portion of the function) for one or more pixels may begin a divergent operational path for the first operation.

As an illustrative example, a first and second initial pixel value may be 255 and 245 respectively. In this example, a portion of the first operation may be "add 5; multiply by 0.5; if the value is less than 130 perform an inverse function x, otherwise perform and inverse function y." The first pixel would comprise a result that leads to the y inverse function while the second pixel value would comprise a result that leads to the x inverse function, which comprises divergent operational paths for the two pixels.

In one embodiment, if the results meet a divergent operation value (YES at 208) for the first operations (e.g., a result that leads to continued performance of a first operational path) a second subset of one or more pixels from the first subset can be identified, at 212, where the second subset comprises one or more pixels comprising the divergent operation value. That is, for example, the pixels which diverge from the first operation path can be grouped into the second subset. Further, at 214, a second operation can be performed in parallel for the respective one or more pixels in the second subset, where the second operation comprises at least a second portion of the function for generating the image pixel value used to represent the element in the image.

As an example, the pixels that comprise the divergent operation value can be grouped into the second subset, and the second operation can be performed in parallel on the second subset; and the pixels from the first subset that did not comprise the divergent operation value, if any, (NO at 208) can continue in the first operation path by continuing to apply the first operation, at 206. Further, the first operation may be applied to the pixels in the first subset that do not comprise the divergent operation value until they are converted (YES at 210) to an output pixel value, at 222.

In this example embodiment 200, the second operation can be performed on the second subset if a divergent result is not obtained (NO at 216) until they are converted to an output pixel value (YES at 218), at 222. However, if a second divergent result is obtained in the performance of the second operation (YES at 216), as described above, a third subset may be identified for the pixels from the second subset that comprise the second divergent value. As an example, a third operation can be performed on the third subset until they are converted to an output value for the pixels, or a third divergent result is obtained. In this example, it can be appreciated that the operations that comprise the function for generating the output value can be performed on respective divergent paths until the respective pixels from the first subset are converted to respective output values for generating the raster version of the image.

Figure 3:
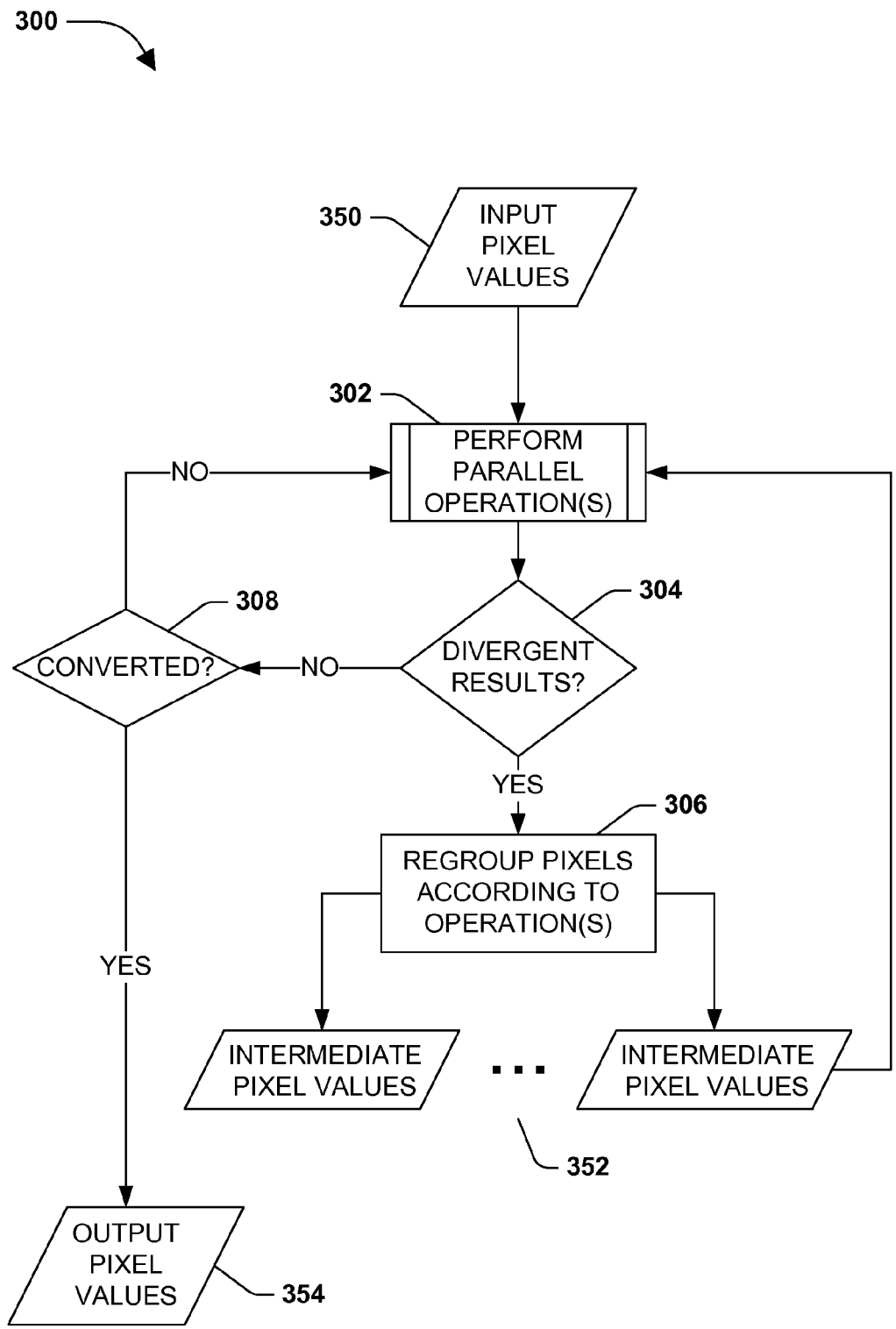
FIG. 3 is a flow diagram illustrating an example embodiment of one or more portions of a method for processing vector-based information for an image.

FIG. 3 is a flow diagram of an example embodiment 300 where one or more portions of a method for processing vector-based information for an image may be implemented. Although not intending to be limiting, reference will, at times, be made to FIG. 4 in discussing FIG. 3, which illustrates an example embodiment 400 of an implementation of one or more techniques described herein. At 302, input pixel values 350 are subjected to parallel operations for a function that generates an image pixel value used to represent an element in an image. As an illustrative example, in FIG. 4, input pixels 402 can be processed in parallel 406.

In one embodiment, performing a first operation in parallel can comprise applying the first operation (e.g., 406) on a data array that comprises pixel values (e.g., 402) in an execution environment. For example, a data array can comprise a plurality of values, respectively representing the plurality of pixels in the first subset. In this way, in this example, respective portions of the first operation can be applied in parallel to the data array, instead of iterating the operation over individual pixel values.

At 308 in the example embodiment 300, if the performance of the first operation produces divergent conversion results (YES at 304), the pixels of the first subset can be grouped into one or more second subsets, at 306. Alternately, if divergent results are not identified (NO at 304), the first operation can continue until the input pixel values are converted (YES at 308) to output pixel values 354. As an example, in FIG. 4, the input pixel values 402 are evaluated in parallel using the first operation 406, until divergent results are identified.

In this example, the divergent results can lead to two or more operation paths for the function that generates the output pixel values 404. The pixels can be regrouped 408 in accordance with the respective operation paths for the conversion function. In this example regrouping 408, pixels A, C and D are grouped into a second operation path 410, and pixels B, E and F are grouped into a third operation path 412 (e.g., where first, second, third, etc. are merely labels and are not indicative of other characteristics, features, etc., such as a timing or temporal aspect, for example).

In FIG. 3, after regrouping the pixels according to the appropriate operations, at 306, one or more second operations can be performed in parallel for the respective pixels in the one or more second subsets (e.g., the regrouped intermediate pixel values 352), where the one or more second operations can comprise at least a second portion of the function for generating the image pixel value used to represent the element in the image. As an example, in FIG. 4, the second operation 410 is performed in parallel on the second subset of pixels comprising A, C and D, and the third operation 412 is performed in parallel on a third subset of pixels comprising B, E and F.

As described above, the parallel processing of respective operation paths for the regrouped pixels can continue until a divergent result is identified in one or more of the operation paths, for example. In one embodiment, if uniformity in the parallel performance of the first operation is broken, the respective pixels in the first subset can be grouped into one or more uniform operation paths, and parallel application of one or more second operations can be performed on the one or more groups of pixels. Alternately, a third operation can be performed on one or more or the pixels individually, for example, where a default operation can comprise iterating a remaining portion of the function over the pixels individually. In this embodiment, the breaking of the uniformity in the parallel performance of the first operation can comprise two or more pixels yielding different operation results that lead to different sequences of operation instructions for the conversion of the two or more pixels.

In FIG. 3, if a divergent result is identified at 304, the pixels from that operation path can be regrouped according to appropriate operations, at 306, and the intermediate values 352 can be evaluated in parallel according to appropriate operations, at 302. This parallel processing can iterate over the one or more subsets of pixels, for example, until the pixels values are converted (YES at 308) to output pixels values according to the function for generating the output pixel values for the image.

Figure 4:
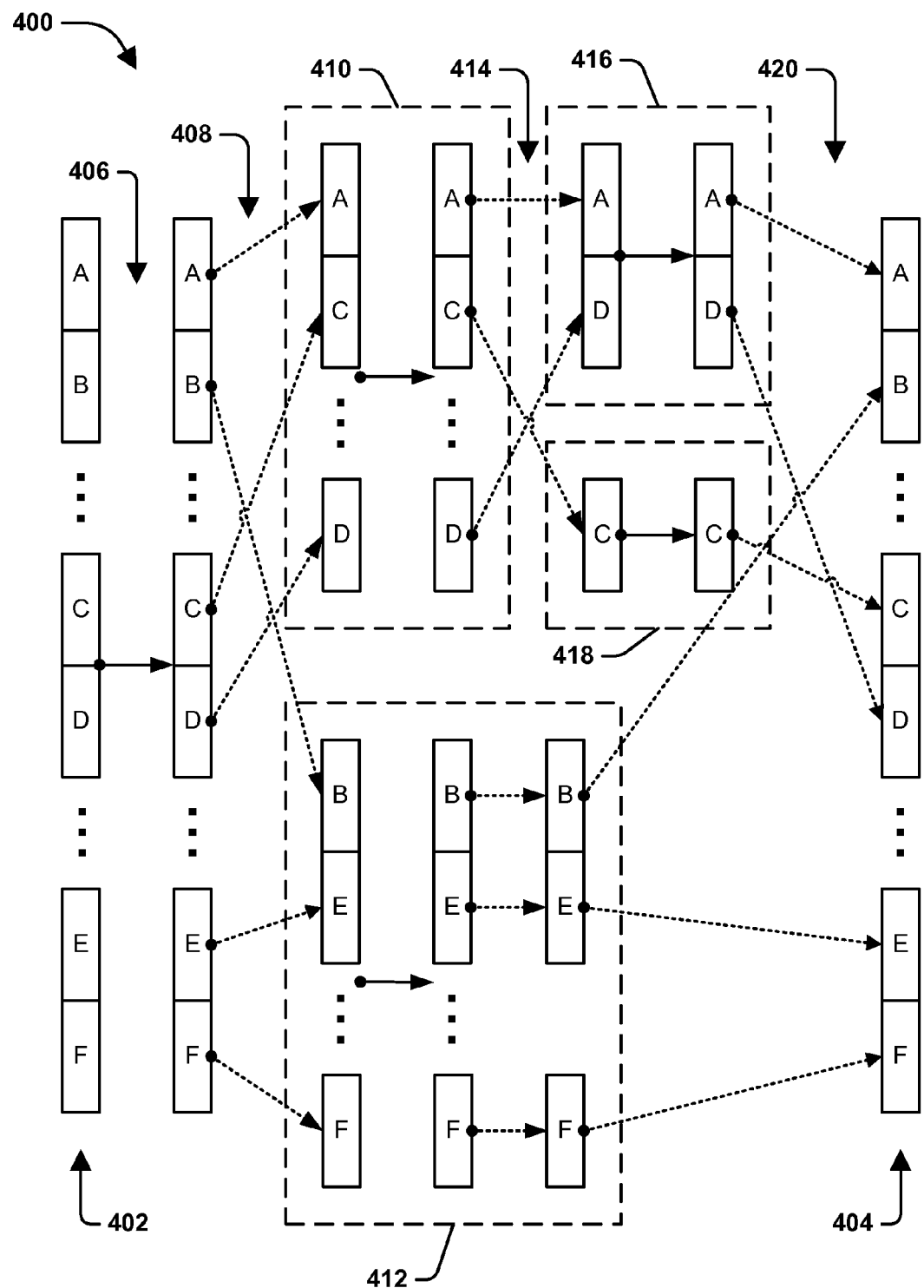
FIG. 4 illustrates an example embodiment of an implementation of one or more techniques described herein.

As an example, in FIG. 4, the third operation 412 on the subset comprising pixels B, E and F continues until the respective pixel values are converted to output pixel values 404, at which point they can be regrouped 420 according to their specified order. Further, the second operation 410 produces a divergent result for pixels A, C and D, where they are regrouped 414 to a fourth operation path 416, comprising pixels A and D, and a fifth operation path 418 comprising pixel C. In this example 400, pixel C has fallen back to a default operation that comprises iterating the remaining portion(s) of the function over the pixel individually. The fourth 416 and fifth 418 operations yield output pixel values 404 for the respective pixels, which can be regrouped 420 according to their specified order.

Figure 5:
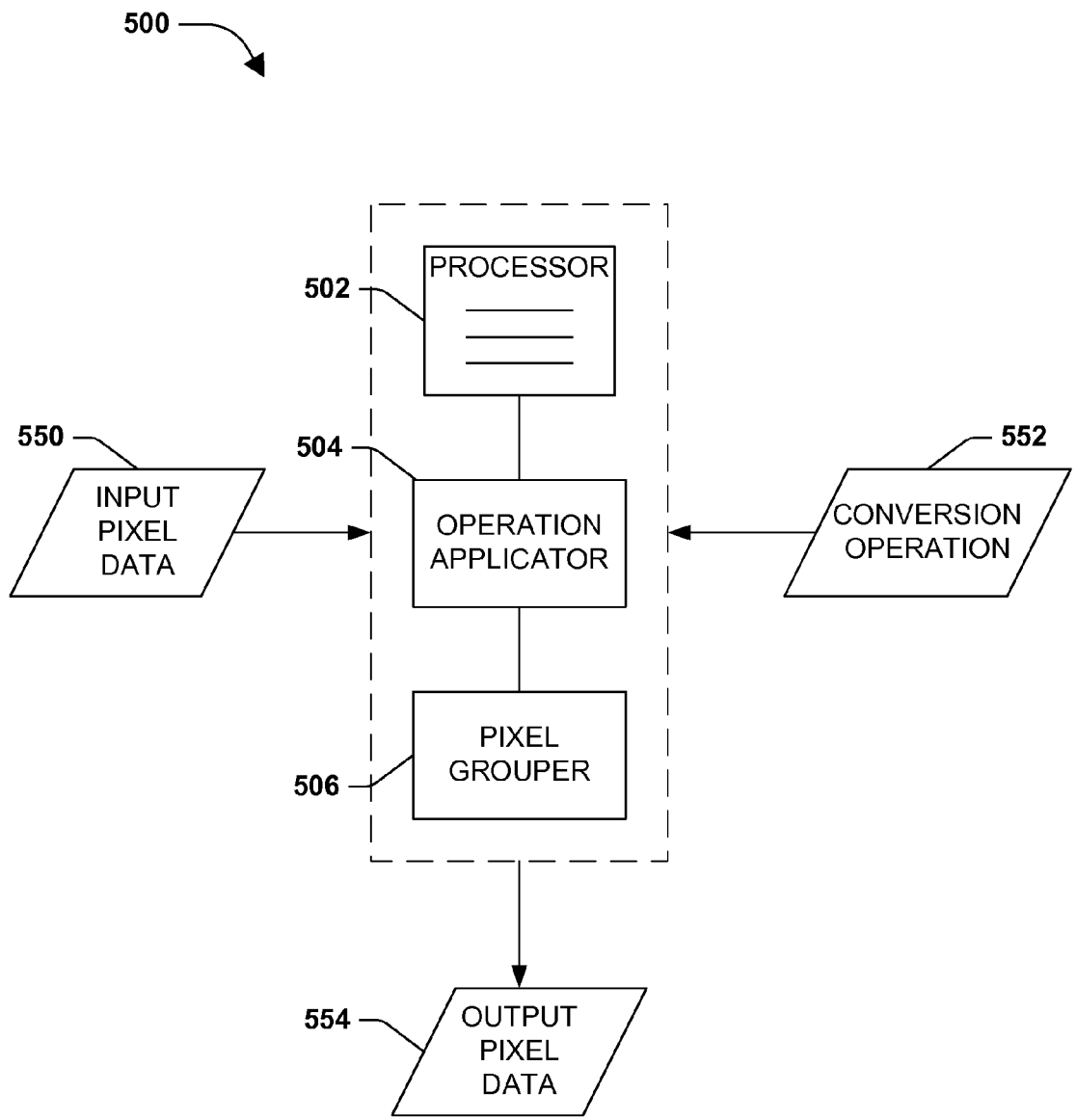
FIG. 5 is a component diagram of an example system for processing vector-based information for an image.

A system may be devised that provides for generating a rasterized version of an image comprising vector-based graphics data, for example, with improved image processing speed. FIG. 5 is a component diagram of an example system 500 for processing vector-based information for an image. A computer-based processor 502 is configured to process data for the system, and the processor 502 is operably coupled with an operation application component 504, which applies one or more operation paths from a vector to raster conversion operation 552 in parallel to data associated with a plurality of pixels 550 from a set of pixels comprising the image, or one or more elements thereof. A pixel grouping component 506 is operably coupled with the operation application component 504, and configured to group pixels into two or more second operation path groups if first path operation results are different for a same sub-operation for two or more pixels. Output pixel data 554, for example, comprising pixel values used to generate the raster version of the image, can be produced from the application of the parallel operation paths for the conversion operation 552.

Figure 6:
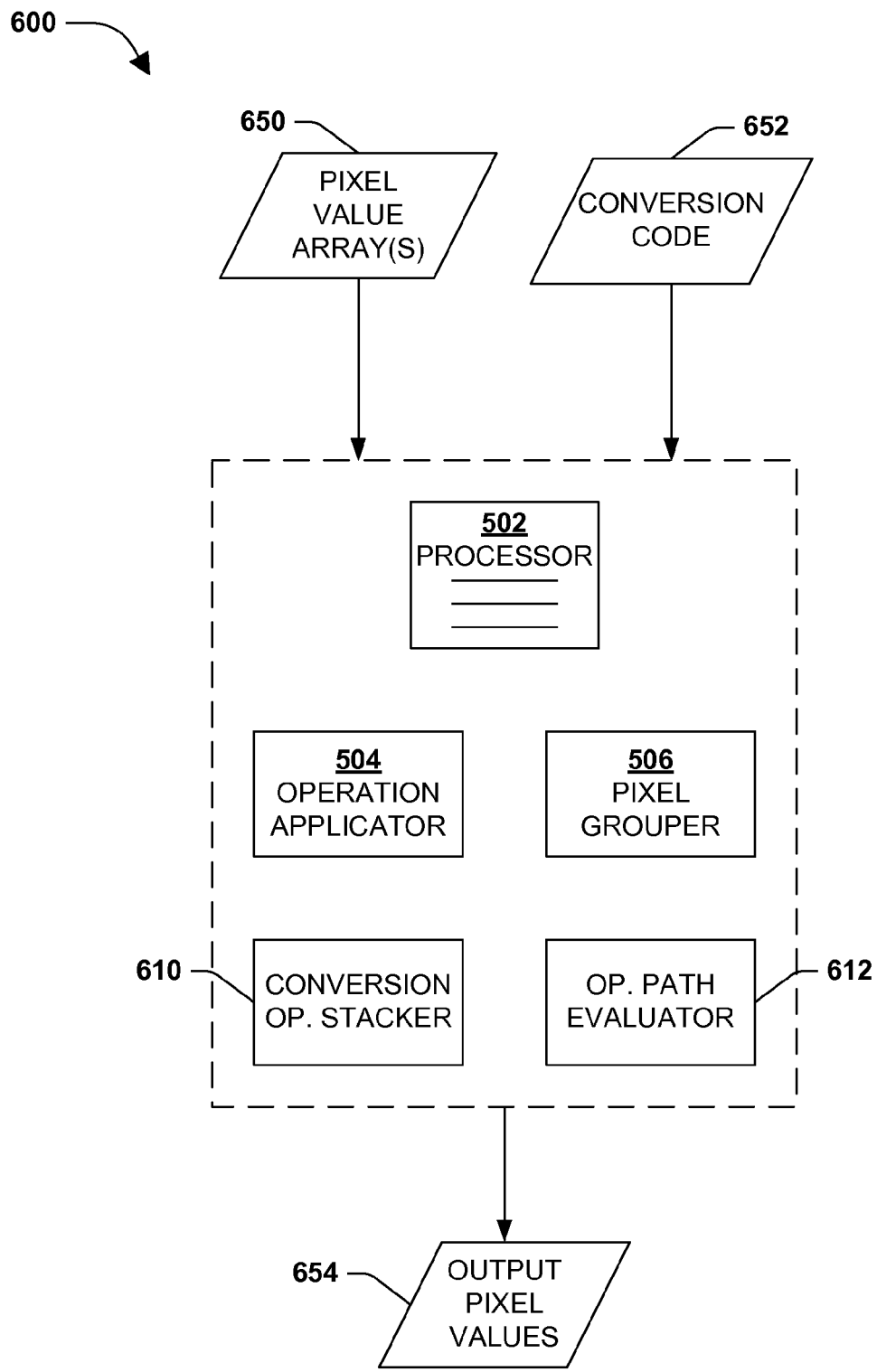
FIG. 6 is a component diagram illustrating an example embodiment where one or more systems described herein can be implemented.

FIG. 6 is a component diagram illustrating an example embodiment 600 where one or more systems described herein can be implemented. An operation path evaluation component 612 can compare a pixel grouping resource cost to speed improvement ratio with a desired threshold to determine whether to group the pixels. For example, information from the pixel grouping component 506 may comprise a number of pixels that are considered for grouping into a subset for an operation.

In this example, the operation path evaluation component 612 can identify a resource cost of grouping the pixels, such as additional computing resources that may be used to group and/or process the group of pixels; and can identify a conversion speed improvement for grouping the pixels, such as a processing speed gain by the grouping and processing in the group. In this way, in this example, the ratio of resource cost to speed gain can be compared against a desired threshold for the ratio to determine whether to proceed with the grouping, and/or or operation processing of the group of pixels.

In one embodiment, a vector to raster conversion operation 652 can comprise programming code comprised of one or more operation paths that are activated by an operation result from a previous path. For example, programming codes commonly utilize mathematical equations and/or logic operations that can drive the data that is processed down different operation paths. An "IF THEN" statement often results in different operation paths, for example, for different input data. In this embodiment, for example, input pixel values that are run in parallel through the conversion operation 652 can provide for divergent operation paths, such as determined by the pixel grouping component 506.

In one embodiment, the data associated with the pixels can be comprised in a data array of pixel values 650. As an example, input pixel data can comprise initial values for the rasterization process of the vector-based data, which are converted to output pixel values for rendering the image, after processing the operations over the values in parallel. In this embodiment, the initial pixel values (e.g., and subsequent regrouped pixel subsets) can be arranged in data arrays for parallel processing of code of the conversion operation 652 to ultimately yield output pixel values 654.

In one embodiment, the pixel grouping component can group the pixels by creating a data array batch for the data associated with the pixels. For example, to run the conversion operation 652 over the array of pixel values 650 in parallel, the arrays can be batched for respective operation paths, so that the values are processed in parallel. A conversion operation stacking component 610 can be configured to stack instructions from the conversion operation to run over the one or more batches of pixels according to appropriate operation paths. For example, code of the conversion operation 652 can comprise sequential operation instructions that are stacked to run over the batches in an appropriate order. In this way, in this example, the instructions for the respective one or more operation paths for the conversion code can be efficiently run over the batches in parallel to yield output pixel values 654.

Figure 7:
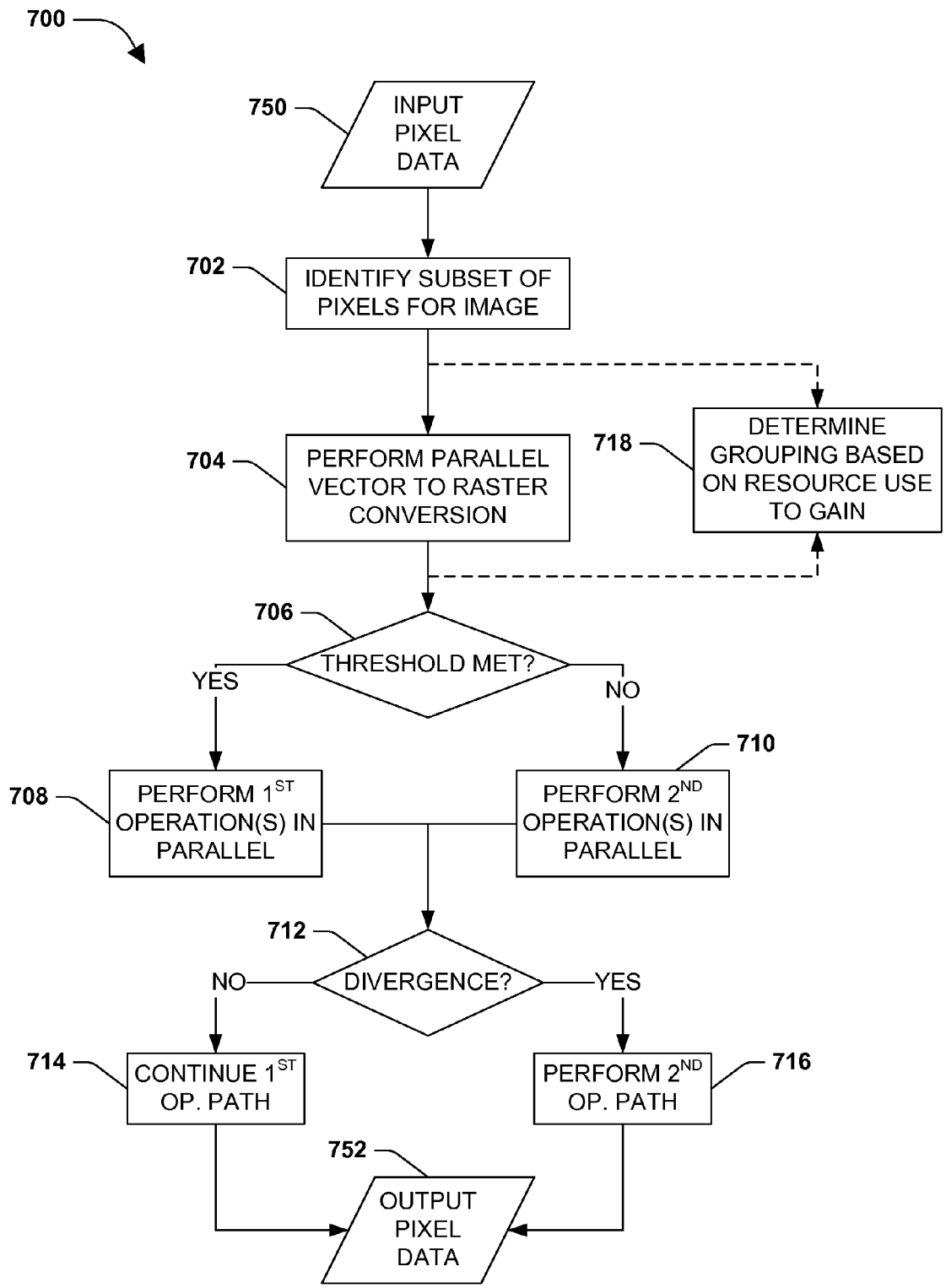
FIG. 7 is a flow diagram of an exemplary method for processing vector-based information for an image.

An alternate method can be devised to efficiently generate a raster image from vector data for the image. FIG. 7 is a flow diagram of an alternate exemplary method 700 for processing vector-based information for an image. At 702, a subset of one or more pixels from a set of pixels comprising the image 750 is identified, where the subset comprises one or more pixels used in a raster representation of an element in the image. At 704, a vector to raster conversion operation is performed for the respective pixels in the subset in parallel.

In one embodiment, prior to grouping the pixels into the subset and/or prior to performing a parallel processing operation, the pixels can be evaluated to determine whether to group the one or more pixels into one or more subsets based on a resource use to speed gain evaluation for the respective pixels, at 718. That is, for example, if an image processing speed gained by grouping and/or processing the grouped pixels does not outweigh an amount of additional computing resources used to perform the grouping and/or processing, the pixels may not be grouped and/or processed in parallel (e.g., processed individually instead).

Performing the vector to raster conversion operation can comprise performing one or more first operations in parallel on one or more of the respective pixels in the subset, at 708, if an operation result meets a desired operation threshold (YES at 706). Further, performing the vector to raster conversion operation can comprise performing one or more second operations in parallel on one or more of the respective pixels in the subset, at 710, if the operation result does not meet the desired operation threshold (NO at 706). For example, a desired operation threshold can comprise the respective pixel values for the conversion operation having a result that provides for continued parallel evaluation of the pixels.

Performing the vector to raster conversion operation for the respective pixels in the subset in parallel can comprise performing operations for the respective pixels in the subset in parallel until at least one sub-operation result from a first operation path of the raster conversion operation for one or more pixels in the subset causes a divergence in the raster conversion operation of the at least one pixel (YES at 712). If there is a divergence in the results from the first operation path, at 712, a second operation path of the raster conversion operation can be performed in parallel for the one or more divergent pixels in the subset, at 716.

Alternately, in this example embodiment 700, the non-divergent pixels in the subset can continue to be evaluated using the first operation path of the raster conversion operation in parallel, at 714, if a divergence in the raster conversion operation is not identified (NO at 712). Further, the respective operation paths can be continued, for example, until the respective pixels for the image are converted to output pixel data 752, which can comprise pixel values used to render a raster image.

Figure 8:
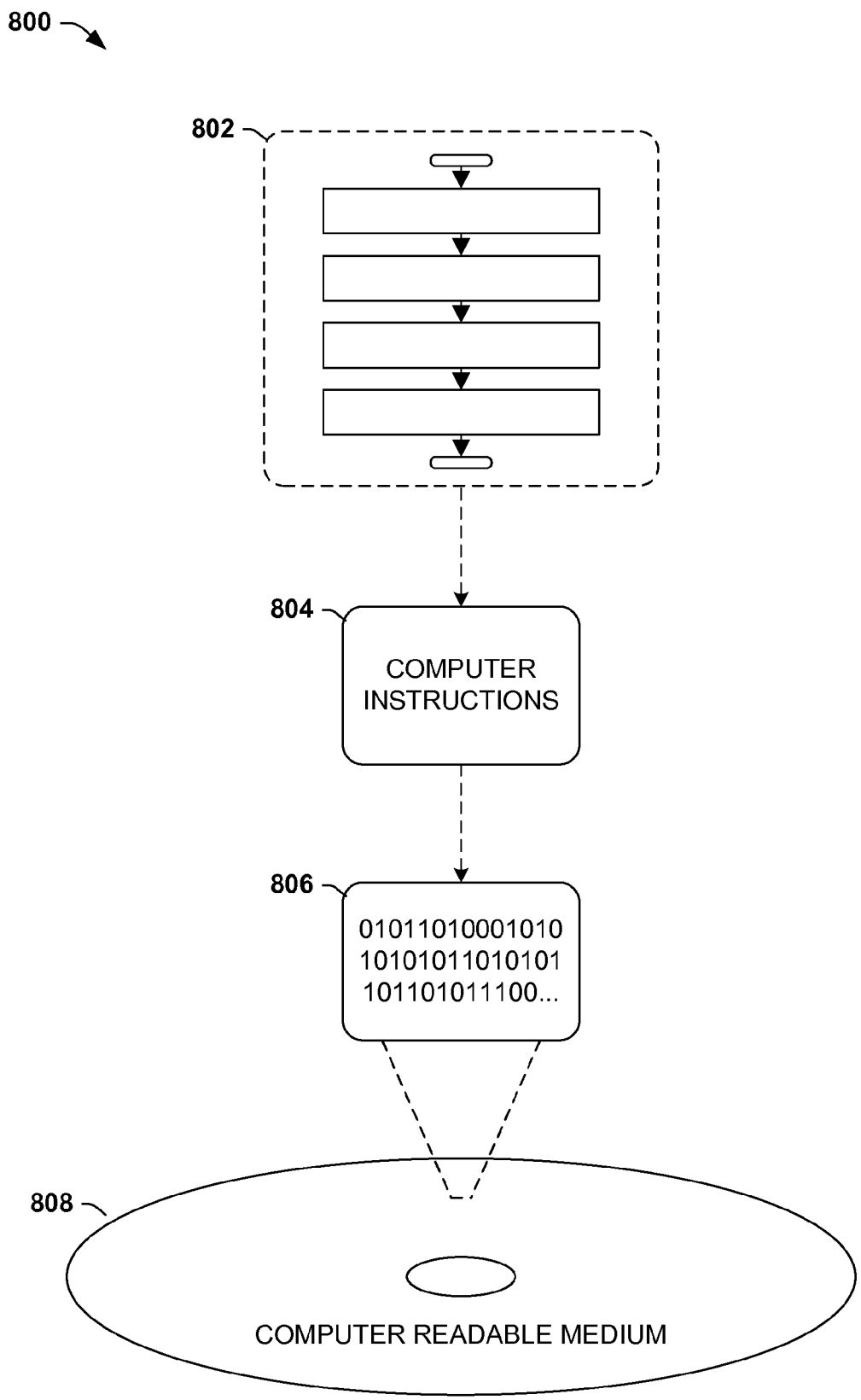
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of the exemplary method 100 of FIG. 1, for example. In another such embodiment, the processor-executable instructions 804 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
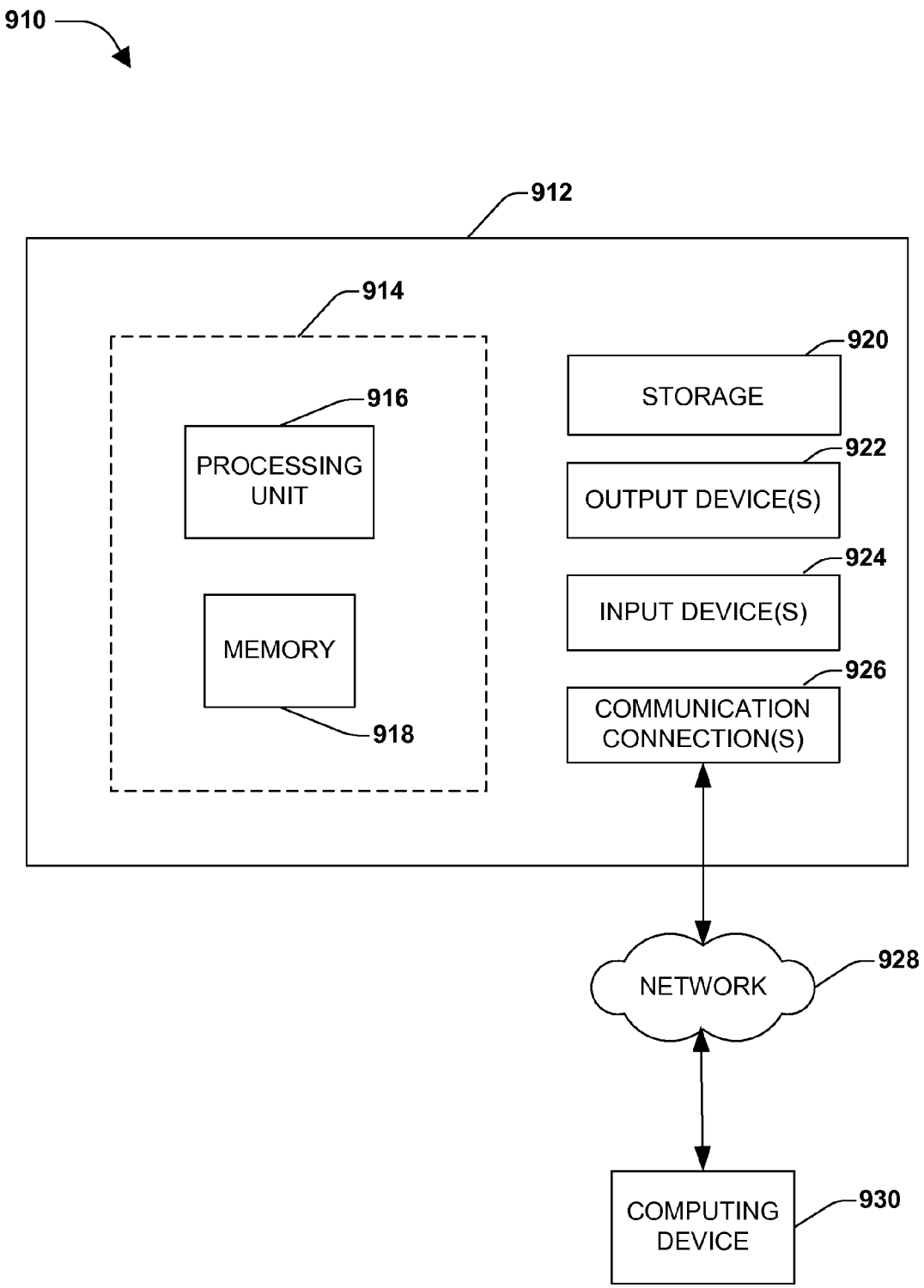
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method comprising:
    detecting a point in image processing code where pixel processing of an image diverges into at least two distinct operation paths;
    grouping pixels of the image into a plurality of subsets based at least upon the at least two distinct operation paths, the plurality of subsets including:
        a first subset comprising multiple first pixels processed by a first distinct operation path in the image processing code, and
        a second subset comprising multiple second pixels processed by a second distinct operation path in the image processing code;
    batching individual first pixels of the first subset into batched first units of data; and
    processing the first subset in parallel using a first processing operation on the batched first units of data to generate corresponding first pixel values of the image.

2. The method of claim 1, further comprising:
    performing a second processing operation on unbatched second pixels of the second subset using a second processing operation.

3. The method of claim 1, further comprising:
    detecting the point where the pixel processing diverges by identifying a conditional statement in the image processing code.

4. The method of claim 1, wherein the grouping comprises:
    identifying a number of the multiple first pixels in the first subset; and evaluating a resource cost of performing the first processing operation on the number of pixels; and performing the batching responsive to a determination that the resource cost meets a threshold.

5. The method of claim 1, further comprising:

detecting the point where the pixel processing diverges by identifying an IF-THEN statement in the image processing code; and grouping the pixels based at least on execution of the IF-THEN statement.

6. The method of claim 5, further comprising:

batching individual second pixels of the second subset into batched second units of data; and processing the second subset in parallel using a second processing operation on the batched second units of data to generate corresponding second pixel values of the image.

7. The method of claim 6, wherein the batched first units of data and the batched second units of data are word-sized data units.

8. The method of claim 7, wherein each of the first pixels and each of the second pixels is one byte.

9. The method of claim 1, performed by a central processing unit.

10. A system comprising:

a processing unit; and a memory storing executable instructions that, when executed, cause the processing unit to:

identify a conditional statement in processing code, the conditional statement identifying at least two distinct operation paths in the processing code;

group pixels into two or more groups, the groups including a first group of first pixels processed by a first operation path identified by the conditional statement and a second group of second pixels processed by a second operation path identified by the conditional statement;

process the first pixels of the first group in parallel by batching the first pixels into larger data units and performing larger data unit-level operations on the larger data units; and process the second pixels of the second group individually using pixel-level operations.

11. The system of claim 10, wherein the executable instructions, when executed, cause the processing unit to:

determine a pixel grouping resource cost to speed improvement ratio of grouping the pixels; and compare the pixel grouping resource cost to speed improvement ratio with a desired threshold to determine whether to group one or more pixels.

12. The system of claim 11, wherein the executable instructions, when executed, cause the processing unit to:

identify a resource cost of grouping the one or more pixels;

identify a conversion speed improvement for processing the first pixels in parallel via the batching; and determine whether to croup the one or more pixels using the resource cost and the conversion speed improvement.

13. The system of claim 10, wherein the first pixels and the second pixels are processed to perform vector to raster conversion.

14. The system of claim 10, wherein the processing unit is a central processing unit.

15. The system of claim 10, wherein the memory is volatile.

16. The system of claim 10, wherein the memory is non-volatile.

17. A system comprising:

a processing unit; and a computer-readable medium, storing instructions that, when executed by the processing unit, cause the processing unit to:

identify a conditional statement in processing code, the conditional statement identifying at least two distinct operation paths in the processing code, the at least two distinct operation paths comprising a first operation path and a second operation path;

group pixels of an image into a first subset of first pixels that are processed using the first operation path and a second subset of second pixels that are processed using the second operation path; and process the first pixels of the first subset using a relatively larger data unit size than the second pixels of the second subset.

18. The system of claim 17, wherein the instructions, when executed by the processing unit, cause the processing unit to:

process the first pixels of the first subset as word-size data units and the second pixels of the second subset as byte-size data units.

19. The system of claim 18, wherein the instructions, when executed by the processing unit, cause the processing unit to:

process the first pixels of the first subset using word-level operations on the processing unit; and process the second pixels of the second subset using byte-level operations on the processing unit.

20. The system of claim 19, wherein the instructions, when executed by the processing unit, cause the processing unit to:

output first pixel values of the first pixels, the first pixel values being determined using the word-level operations; and output second pixel values of the second pixels, the second pixel values being determined using the byte-level operations.

* * * * *